United States Patent
Choi et al.

(10) Patent No.: US 9,681,375 B2
(45) Date of Patent: Jun. 13, 2017

(54) SCHEDULING SCHEMES FOR USER EQUIPMENT POWER SAVING IN A COMMUNICATION NETWORK

(71) Applicant: MARVELL WORLD TRADE LTD., St. Michael (BB)

(72) Inventors: Jihwan P. Choi, Daegu (KR); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 902 days.

(21) Appl. No.: 13/886,015

(22) Filed: May 2, 2013

(65) Prior Publication Data

US 2013/0294309 A1 Nov. 7, 2013

Related U.S. Application Data

(60) Provisional application No. 61/641,430, filed on May 2, 2012.

(51) Int. Cl.
| | |
|---|---|
| *H04W 52/02* | (2009.01) |
| *H04W 72/04* | (2009.01) |
| *H04L 5/00* | (2006.01) |
| *H04W 16/04* | (2009.01) |

(52) U.S. Cl.
CPC ....... *H04W 52/0209* (2013.01); *H04L 5/0039* (2013.01); *H04L 5/0044* (2013.01); *H04L 5/0053* (2013.01); *H04W 72/0453* (2013.01); *H04W 16/04* (2013.01); *H04W 52/0212* (2013.01); *Y02B 60/50* (2013.01)

(58) Field of Classification Search
None
See application file for complete search history.

(56) References Cited

U.S. PATENT DOCUMENTS

| 6,807,146 B1 | 10/2004 | McFarland |
| 8,155,138 B2 | 4/2012 | van Nee |
| | (Continued) | |

FOREIGN PATENT DOCUMENTS

| WO | WO/2011/040852 A1 | 4/2011 |
| WO | WO-2012/162576 A1 | 11/2012 |

OTHER PUBLICATIONS

International Search Report issued in corresponding PCT/US2013/039305 mailed Sep. 26, 2013.

(Continued)

*Primary Examiner* — Mounir Moutaouakil

(57) ABSTRACT

In a method of allocating wireless medium resources in a communication system, the communication system including a base station and a plurality of client stations sharing a channel bandwidth, a frequency sub-band of the channel bandwidth is selected for allocating wireless medium resources to a client station. Wireless medium resources are allocated at the base station to the client station. The base station is constrained to allocate wireless medium resources to the client station within the selected frequency sub-band. A subframe is generated for transmission to the client station. The subframe includes at least a data region that contains data for the client station. The data for the client station is confined to be within the selected frequency sub-band.

24 Claims, 7 Drawing Sheets

(56) References Cited

U.S. PATENT DOCUMENTS

| | | | | |
|---|---|---|---|---|
| 8,400,955 | B2* | 3/2013 | Singh | H04W 52/0206 340/1.1 |
| 8,526,351 | B2 | 9/2013 | Fischer et al. | |
| 8,724,720 | B2 | 5/2014 | Srinivasa et al. | |
| 8,849,331 | B2* | 9/2014 | Liu | H04W 52/0235 370/311 |
| 8,904,207 | B2* | 12/2014 | Kwon | H04W 52/0235 713/300 |
| 9,007,968 | B2* | 4/2015 | Singh | H04W 72/044 370/310 |
| 9,167,526 | B2* | 10/2015 | Yun | H04W 52/0251 |
| 9,167,557 | B2* | 10/2015 | Dhanda | H04W 76/048 |
| 9,247,531 | B2* | 1/2016 | Fong | H04W 72/0406 |
| 9,414,311 | B2* | 8/2016 | Kella | H04W 52/0216 |
| 2009/0196163 | A1 | 8/2009 | Du | |
| 2010/0232373 | A1* | 9/2010 | Nory | H04W 72/1289 370/329 |
| 2011/0002219 | A1 | 1/2011 | Kim et al. | |
| 2011/0002281 | A1* | 1/2011 | Terry | H04W 52/0216 370/329 |
| 2011/0013550 | A1 | 1/2011 | Wu | |
| 2011/0026498 | A1* | 2/2011 | Zheng | H04L 5/0007 370/336 |
| 2011/0086662 | A1* | 4/2011 | Fong | H04W 72/0406 455/517 |
| 2011/0116454 | A1 | 5/2011 | Chen et al. | |
| 2011/0128901 | A1 | 6/2011 | Lee et al. | |
| 2012/0014257 | A1 | 1/2012 | Ahluwalia et al. | |
| 2012/0182958 | A1* | 7/2012 | Pelletier | H04L 5/001 370/329 |

OTHER PUBLICATIONS

Written Opinion issued in corresponding PCT/US2013/039305 mailed Sep. 26, 2013.

Texas Instruments, "Downlink and Uplink Control to Support Carrier Aggregation," 3GPP TSG RAN WG1 #57, doc. No. R1-091838, May 4-8, 2009.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE 802.20-PD-06; IEEE P 802.20$^{TM}$V14, Draft 802.20 Permanent Document; <System Requirements for IEEE 802.20 Mobile Broadband Wireless Access Systems—Version 14>, 24 pages (Jul. 16, 2004).

3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", 42 pages (Dec. 2010).

3GPP TS 23.203 V10.6.0, "3rd Generation Partnership Project; Technical Specification Group Services and System Aspects; Policy and Charging Control Architecture (Release 10)", 131 pages (Mar. 2012).

3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", 297 pages (Dec. 2010).

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", 101 pages (Dec. 2011).

3GPP TS 36.212 V10.5.0, "3rd Generation Partnership Project; Technical Specification Group Radio Access Network; Evolved Universal Terrestrial Radio Access (E-UTRA); Multiplexing and channel coding (Release 10)", 79 pages (Mar. 2012).

3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), 125 pages (Mar. 2012).

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 194 pages (Mar. 2012).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 149 pages (Mar. 2010).

3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", 32 pages (Dec. 2010).

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", 296 pages (Dec. 2011).

ITU-T Recommendation G.9960, "Unified high-speed wireline-based home networking transceivers—System architecture and physical layer specification," *Int'l Telecommunication Union*, pp. 1-160 (Dec. 2011).

(56) References Cited

OTHER PUBLICATIONS

ITU-T Recommendation G.9960, Erratum 1 to Recommendation ITU-T G.9960, *Int'l Telecommunication Union*, 1 page (Jul. 2012).
ITU-T Recommendation G.9960, Erratum 2 to Recommendation ITU-T G.9960, *Int'l Telecommunication Union*, 4 pages (Sep. 2012).
ITU-T Recommendation G.9963, "Unified high-speed wireline-based home networking transceivers—Multiple input-multiple output specification" *Int'l Telecommunication Union*, pp. 1-90 (Dec. 2011).
Boyd et al., "Convex Optimization," *Cambridge University Press*, pp. 1-728 (2004).
Brown, "G.hn: Draft text for G.9960 (2010) corrigendum 1," *International Telecommunication Union*, pp. 1-184 (Feb. 2011).
Clausen, "Branch and Bound Algorithms—Principles and Examples," Department of Computer Science, University of Copenhagen, pp. 1-30 (Mar. 12, 1999).
Land et al., "An Automatic Method of Solving Discrete Programming Problems," *Econometrica*, vol. 28, No. 3, pp. 497-520 (Jul. 1960).
Lin et al., "Optimal and Near-Optimal Resource allocation Algorithms for OFDMA Networks," *IEEE Transactions on Wireless Communications*, vol. 8, No. 8, pp. 4066-4077 (Aug. 2009).
Pedersen et al., "Carrier Aggregation for LTE-Advanced: Functionality and Performance Aspects," IEEE Communications Magazine, vol. 49, No. 6, pp. 89-95 (Jun. 1, 2011).
Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Wannstrom, "Carrier Aggregation explained," pp. 1-6 (May 2012).
Yuan et al., "Carrier Aggregation for LTE-Advanced Mobile Communication Systems," IEEE Communications Magazine, pp. 88-93 (Feb. 2010).
International Preliminary Report on Patentability in corresponding International Application No. PCT/US2013/039305, dated Nov. 4, 2014 (11 pages).

* cited by examiner

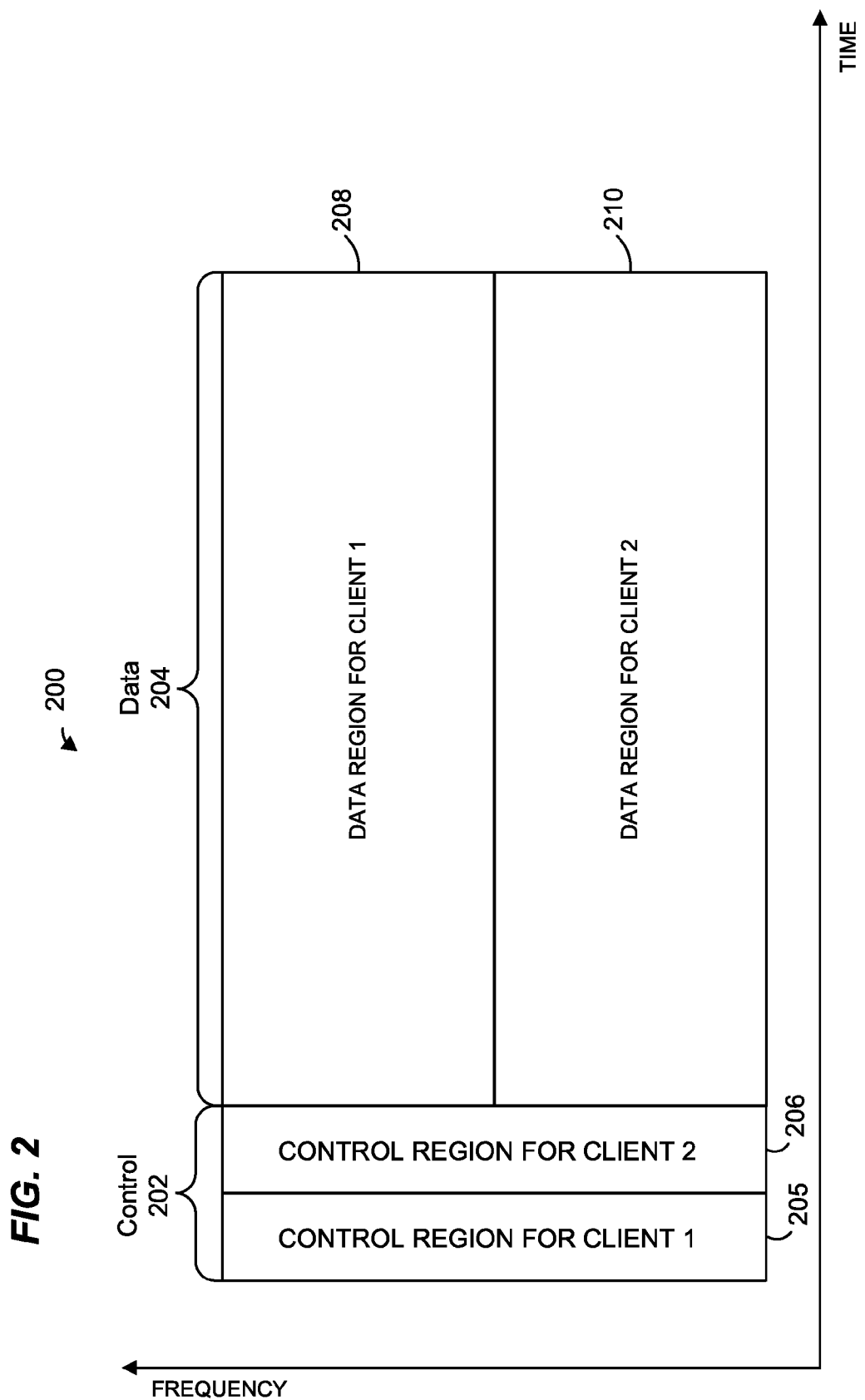

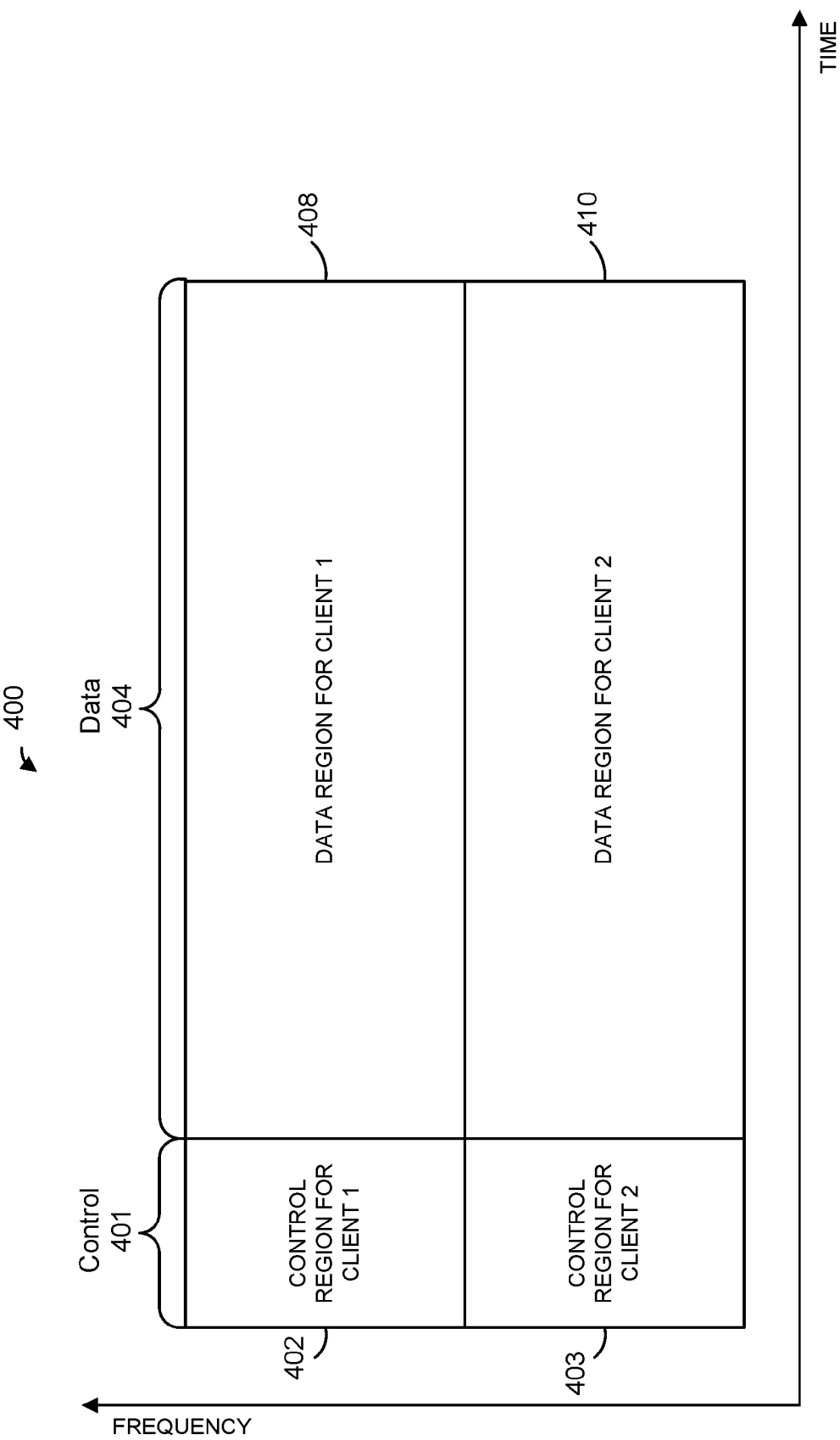

SCHEDULING SCHEMES FOR USER EQUIPMENT POWER SAVING IN A COMMUNICATION NETWORK

CROSS-REFERENCES TO RELATED APPLICATIONS

This disclosure claims the benefit of U.S. Provisional Patent Application No. 61/641,430, filed on May 2, 2012, which is incorporated herein by reference in its entirety.

FIELD OF THE DISCLOSURE

The present disclosure relates generally to communication networks and, more particularly, to power saving in a communication network.

BACKGROUND

Some wireless communication systems, such as mobile telephony systems and systems employing technologies proffered by the $3^{rd}$ Generation Partnership Project (3GPP) (e.g., the High-Speed Packet Access (HSPA) standard, the Evolved High-Speed Packet Access (HSPA+) standard, the Long Term Evolution (LTE) standard, etc.) and the IEEE 802.16 family of communication standards, include one or more base stations and two or more client stations that communicate with the one or more base stations by transmitting data in a plurality of time and frequency slots. A base station needs to allocate wireless medium resources (e.g., time and/or frequency) among the client stations. For example, if the base station serves five clients, but only needs to transmit data to two of the clients, the base station may allocate downlink wireless medium resources only to the two clients for which the base station has data. As another example, if all of the five stations have data to transmit to the base station, but one of the stations has much more data than the other stations, the base station may allocate uplink wireless medium resources to all of the clients, but allocate more resources to the one station with the greater amount of data. In some systems, at times that a client station is not scheduled for transmission or reception of data to or from the base station, the client station may conserve power by operating in an non-active, power save, or idle mode for a certain period of time, such as until the client station needs to "wake up" to transmit data to or to receive data from the base station.

SUMMARY

In an embodiment, a method of allocating wireless medium resources in a communication system, the communication system including a base station and a plurality of client stations sharing a channel bandwidth, includes selecting, for allocating wireless medium resources to a client station, a frequency sub-band of the channel bandwidth. The method also includes allocating, at the base station, wireless medium resources to the client station, wherein the base station is constrained to allocate wireless medium resources to the client station within the selected frequency sub-band. The method additionally includes generating a subframe for transmission to the client station, wherein the subframe includes at least a data region, and wherein the data region contains data for the client station, the data for the client station confined to be within the selected frequency sub-band.

In another embodiment, a communication device that is configured to allocate wireless medium resources in a communication system, the communication system including a plurality of client stations sharing a channel bandwidth, comprises a network interface configured to select, for allocating wireless medium resources to a client station, a frequency sub-band of the channel bandwidth. The network interface is also configured to perform allocation of wireless medium resources to the client station, wherein allocation of wireless medium resources to the client station is constrained to be within the selected frequency sub-band. The network interface is additionally configured to generate a subframe for transmission to the client station, wherein the subframe includes at least a data region, and wherein the data region contains data for the client station, the data for the client station confined to be within the selected frequency sub-band.

In yet another embodiment, a method of operating a client station in a communication system, the communication system including a base station and a plurality of client stations sharing a channel bandwidth, includes receiving, at a client station, a subframe having a control region and a data region, wherein the data region contains data for the client station, wherein the data is constrained to be within a frequency sub-band of the channel bandwidth. The method additionally includes switching operation of the client station from a fully powered state to a partially powered state for reception and processing of at least the data region of the subframe, wherein in the partially powered state, power is supplied to circuitry needed to receive and process only the frequency sub-band that contains data for the client station.

In still another embodiment, a communication device configured to operate in a communication system, the communication system including a plurality of client stations sharing a channel bandwidth, comprises a network interface configured to receive a subframe having a control region and a data region, wherein the data region contains data for the communication device, the data constrained to be within a frequency sub-band of the channel bandwidth. The network interface is additionally configured to switch operation from a fully powered state to a partially powered state for reception and processing of at least the data region of the subframe, wherein in the partially powered state, power is supplied to circuitry needed to receive and process only the frequency sub-band that contains data for the communication device.

BRIEF DESCRIPTION OF THE DRAWINGS

FIG. 2 is a diagram of subframe that a base station is configured to transmit to several client stations, according to an embodiment.

FIG. 4 is a diagram of a subframe that a base station is configured to transmit to several client stations, according to another embodiment.

DETAILED DESCRIPTION

In embodiments described below, a wireless network device such as an evolved node base device (eNB) of a communication network transmits to and receives from one or more other wireless network devices, such as a user equipment device (UE). eNB and UE correspond to terminology used in the 3$^{rd}$ Generation Partnership Project Long Term Evolution (3GPP LTE) Standard. The apparatus and methods discussed herein, however, are not limited to 3GPP LTE networks. Rather, the apparatus and methods discussed herein may be utilized in other types of wireless communication networks as well. For instance, another example system that may utilize embodiments of apparatus and methods described herein is a technology promulgated by the Worldwide Interoperability for Microwave Access (Wi-MAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. In other embodiments, other types of systems may utilize apparatus and methods described herein such as communication systems that conform to the IEEE 802.16 Standard, wireless local area network (WLAN) systems such as systems that conform to the IEEE 802.11 ac Standard, etc. For ease of explanation, the description below refers to base stations (eNBs) and client stations (UEs).

Figure 1:
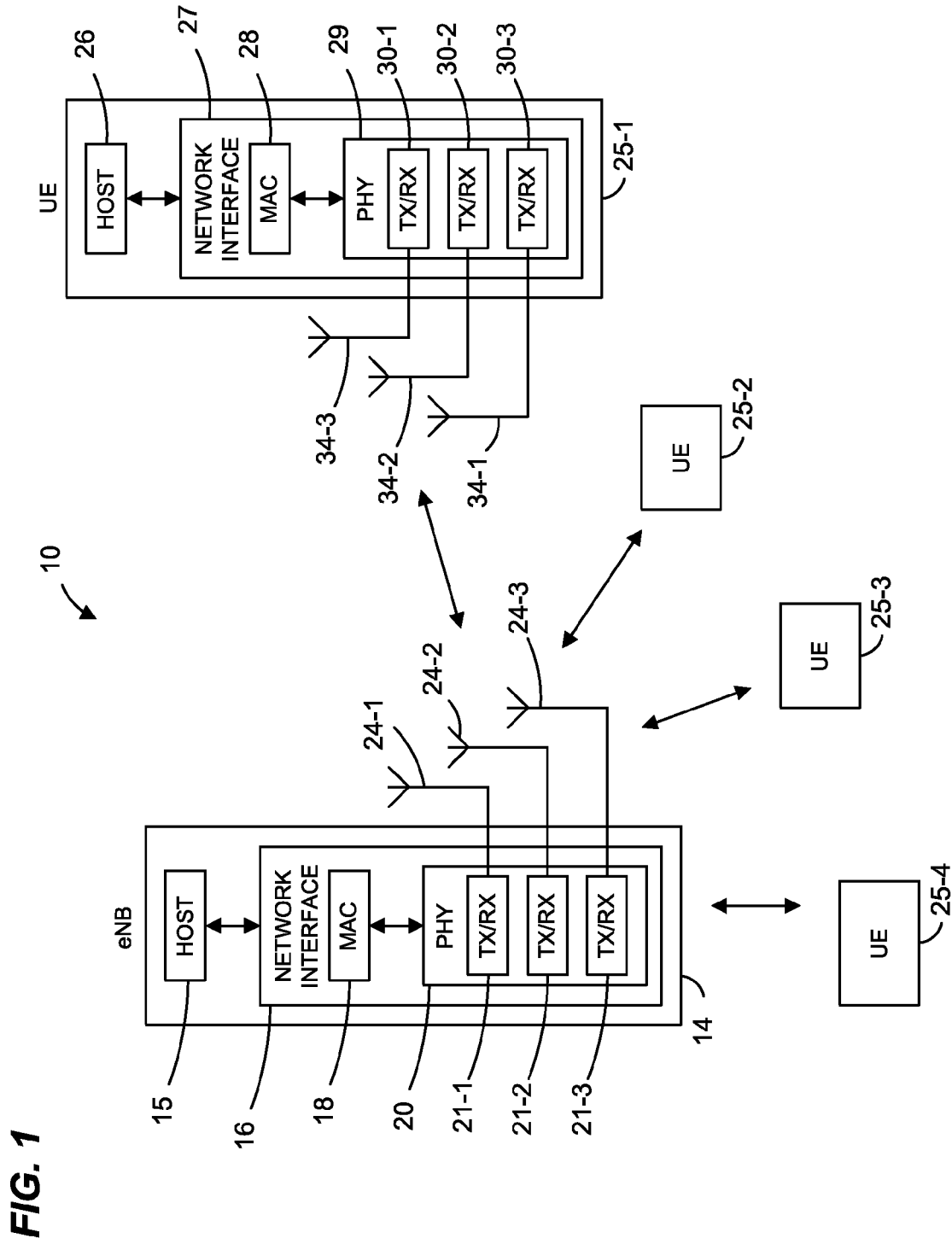
FIG. 1 is a block diagram of an example wireless communication network which supports multicast broadcasting, according to an embodiment.

FIG. 1 is a block diagram of an example wireless communication network 10, according to an embodiment. An Evolved Node B (eNB) device 14, also referred to herein as a base station, includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although two transceivers 21 and two antennas 24 are illustrated in FIG. 1, the AP 14 can include different numbers (e.g., 3, 4, 5, etc.) of transceivers 21 and antennas 24 in other embodiments. In some embodiments, multiple transceivers 21 are coupled to the same antenna. Additionally, in some embodiments, the base station 14 is configured to utilize antenna diversity, antenna beamforming, and/or a multiple input, multiple output (MIMO) technique such as spatial multiplexing. The number of antennas 24 need not be the same as the number of transceivers 21.

The network 10 includes a plurality of user equipment (UE) devices 25, also referred to herein as client stations. Although three client stations 25 are illustrated in FIG. 1, the WLAN 10 can include different numbers (e.g., 1, 2, 4, 5, 6, etc.) of client stations 25 in various scenarios and embodiments.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although two transceivers 30 and two antennas 34 are illustrated in FIG. 1, the client station 25-1 can include different numbers (e.g., 3, 4, 5, etc.) of transceivers 30 and antennas 34 in other embodiments. In some embodiments, multiple transceivers 30 are coupled to the same antenna. Additionally, in some embodiments, the client station 25-1 is configured to utilize antenna diversity, antenna beamforming, and/or a multiple input, multiple output (MIMO) technique such as spatial multiplexing. The number of antennas 34 need not be the same as the number of transceivers 30.

In various embodiments, one or more of the UEs 25-2, 25-3, and 25-4 has a structure the same as or similar to the client station 25-1.

In an embodiment, the PHY processing unit 20 and/or the MAC processing unit 18 of the eNB 14 is configured to utilize synchronization techniques for multicast service control signals when broadcasting to all or a portion of the UEs 25.

In an embodiment, the base station 14 is configured to allocate wireless medium resources among the client stations 25 by scheduling transmissions in the downlink direction (from eNB 14 to UEs 25) and in the uplink direction (from UEs 25 to eNB 14) between the base station 14 and the client station 25. For example, when the base station 14 has data to transmit to one or more of the client stations 25, the base station 14 divides the resources in frequency and/or time domains among the one or more client stations 25, in an embodiment. Similarly, when one or more client stations 25 have data to send to the base station 14, the one or more client stations 25 request the base station 14 to allocate to the one or more client stations 25 resources (in time and/or frequency domains) for transmission to the base station 14. In general, the base station 14 is configured to operate within a system bandwidth, and to schedule transmissions to and from the client stations 25 within the system bandwidth, in various embodiments. For example, the base station 14 is configured to operate within a system bandwidth of 20 MHz, and to support client stations 25 configured to operate in the entire 20 MHz bandwidth and/or client stations 25 configured to operate in certain sub-bands or channels (e.g., 1.4 MHz channel, 5 MHz channel, 10 MHz channel, 15 MHz channel, or any other suitable bandwidth channel) within the entire 20 MHz system bandwidth. In other embodiment, the base station 14 is configured to operate with a suitable system bandwidth different than 20 MHz, and is configured to support client stations 25 configured to operate in the entire system bandwidth different than 20 Mhz and/or client stations configured to operate in any suitable channels within the entire system bandwidth different than 20 MHz.

According to an embodiment, the base station 14 is configured to allocate resources among client stations 25 that share a channel bandwidth in a manner that allows the client stations 25 to save power by operating in a partially powered state during reception, transmission and/or processing of at least the data (e.g., in a data region of a subframe) received (or transmitted) by the client stations 25. For example, the base station 14 allocates resources to the client stations 25 by scheduling resources for the client stations 25 in respective frequency sub-bands of the channel bandwidth selected for each client station 25, in some embodiments. In an embodiment, the base station 14 informs the client stations 25 of the particular frequency sub-bands within which resources are scheduled for the client stations 25, and of specific allocations within the frequency sub-bands for each of the client stations 25, for example by transmitting such information in respective control channels for each of the client stations 25. The control channels are generally distributed in frequency, in some embodiments. In such embodiments, the control information for each client stations is transmitted in the entire channel bandwidth, and the data for each client station 25 is transmitted in a respective frequency sub-band of the entire channel bandwidth. In at least some such embodiments, the client stations 25 are configured to operate in a fully powered state during reception, transmission, and/or processing of control information (e.g., in a control region of a subframe) that the client station 25 receives from or transmits to the base station 14, and to switch to a partially powered state during reception, transmission, and/or processing of data (e.g., in a data region of a subframe).

As used herein, a "fully powered state" of a client station 25 refers to a state in which the client station 25 fully powers circuitry (e.g. radio frequency (RF) circuitry, baseband circuitry, etc.) that is needed to receive and/or process the entire frequency band in which the client station 25 is generally configured to operate. On the other hand, as referred to herein, a "partially powered state" of a client station 25 refers to a state in which the client station 25 powers circuitry (e.g. radio frequency (RF) circuitry, baseband circuitry, etc.) needed to receive, transmit, and/or process only a portion of the entire frequency band in which the client station 25 is generally configured to operate. For example, a client station 25 can operate in a partially powered state when the client station 25 knows or determines that the client station 25 needs to receive, process, or transmit within a localized frequency sub-band of the entire band in which the client station 25 is configured to operate, such as when the base station 14 schedules transmissions to and from the client station 25 within only a sub-band of the entire band in which the client station 25 is configured to operate, in an embodiment.

Operating in partially powered state allows a client station 25 to save power by powering only the portion (or portions) of the circuitry that is required to receive, transmit, and/or process data (or information) only in the frequency band allocated to the client station 25, and powering down the portion (or portions) of the circuitry not needed to receive, transmit, and/or process data (or information) for the client station 25, in various embodiments and/or scenarios. For ease of explanation, the embodiments described below are generally describe with respect to downlink transmissions from the base station 14 to the client stations 25. However, it should be understood that similar techniques are utilized for uplink transmissions from the client stations 25 to the base station 14, in some embodiments. For example, scheduling uplink transmissions for a client station 25 within a frequency sub-band selected for the client station 25 allows the client station 25 to save power by operating the partially powered state for transmission of at least the data region of a subframe (or a sequence of subframes) that the client station 25 transmits to the base station 14, in some embodiments.

In an embodiment, the base station 14 allocates resources to the client stations 25 in units referred to herein as resource blocks (RBs). In an embodiment, the resource block has a defined time length. For example, in one embodiment, the length of the resource block is 1 millisecond (ms). The resource block has other suitable time lengths (e.g., 0.5 ms, 2 ms, or another suitable time lengths), in other embodiments. In orthogonal frequency domain multiple access (OFDMA) systems, the resource block has a defined frequency width. For example, in one embodiment, the RB has a width corresponding to one OFDMA subcarrier. In another embodiment, resource block has a width corresponding to a suitable number of OFDMA subcarriers different than one (e.g., a power of two, a multiple of two, a multiple of four, a multiple of five, a multiple of 12, such as in the LTE standard, etc.). The number of RBs in a subframe transmitted by the base station 14 depends on the system bandwidth, in an embodiment. As an example, a subframe transmitted in a 20 MHz frequency band includes 100 resource blocks, in one embodiment. In another embodiment, a 20 MHz subframe includes a suitable number of resource blocks different than 100 RBs.

Resources are scheduled dynamically or semi-persistently, in some embodiments and/or scenarios. In dynamic scheduling, the base station 14 allocates resources independently for each subframe, in an embodiment. Dynamic scheduling is utilized, for example, for transmission of data that is "bursty" in nature, transmitted infrequently or irregularly, and/or is bandwidth consuming, for example, in some embodiments. As just some examples, dynamic scheduling is utilized for web surfing applications, video streaming applications, e-mail transmission, etc., in some embodiments. Dynamic scheduling is used to schedule unicast transmissions to a single client station, or broadcast transmissions to some or all client stations serviced by the base station 14, in various embodiments. A client station for which dynamic scheduling is utilized generally needs to receive and process control information in a subframe to determine which resources are allocated to the client station in the subframe, in an embodiment.

On the other hand, in semi-persistent scheduling (SPS), resource allocation for a particular client station persists over a number of subframes sent to (or by) the client station, in an embodiment. For example, in an embodiment, the base station 14 defines a pattern of transmission for a particular client station, for example by scheduling the client station to receive data at one or more particular time and frequency slots (e.g., at particular resource block locations) in every $n^{th}$ subframe, where n is an integer. The base station 14 transmits scheduling information in the control region of the first subframe in the pattern, in an embodiment. Semi-persistent scheduling then persists for a certain number of subframes, for example, or until the base station 14 cancels or redefines the defined scheduling, in an embodiment. Semi-persistent scheduling is utilized for real time applications, such as voice over internet protocol (VoIP), for example, in which data is transmitted in short frequent bursts, in some embodiments. Because control information need not be transmitted in each semi-persistently scheduled subframe, semi-persistent scheduling generally reduces overhead associated with transmission of control information, in various embodiments.

FIG. 2 is a diagram of a subframe 200 that the base station 14 is configured to transmit to several client stations 25, according to an embodiment. The subframe 200 spans a plurality of OFDM symbols. For example, the subframe 200 spans an integer number of OFDM symbols, such as 14 OFDM symbols, in one embodiment. In other embodiments, the subframe 200 spans other suitable integer or non-integer numbers of OFDM symbols. The subframe 200 includes a control region 202 followed by a data region 204. The control region 202 is generally used to transmit control channels 206 (e.g., physical downlink control channels (PDCCHs), each control channel 206 used to carry control information for a particular client station scheduled in the subframe 200. In an embodiment, the control region 202 occupies one OFDM symbol in the subframe 200, and the data region 204 occupies 13 OFDM symbols, in one embodiment. As another example, in another embodiment, the control region 202 occupies another suitable number of OFDM symbols (such as 2, 3, 4, etc.) OFDM symbols, and the data region 204 occupies a corresponding number of remaining OFDM symbols (such as 12, 11, 10, etc.) OFDM symbols. In some embodiments, the control region 202 occupies a maximum number of 4 OFDM symbols, and the data region 204 occupies a minimum number of 10 OFDM symbols.

In an embodiment, the control region 202 is distributed in frequency over the entire bandwidth of the subframe 200. Each client station 25 is configured to receive the control region 202 and to decode the control information for the particular client station, in an embodiment. In some embodiments, to allow client stations to save power by powering circuitry needed to receive and/or process only a portion of the entire bandwidth, at least in the data region 204 of the subframe 200, the base station 14 allocates resources for each client station 25 within a certain sub-band selected for the client station 25. For example, in an embodiment, the base station 14 is constrained to allocate resources for each client station 25 within a certain sub-band selected for the client station 25, in an embodiment. In another embodiment, the base station 14 is not constrained to allocate resources for each client station 25 within a certain sub-band selected got the client station 25, but allocates resources within a certain sub-band selected based, for example, on channel conditions, in other embodiments. Accordingly, in the embodiment of FIG. 2, the data region includes a first sub-region 208 selected for a first client station (e.g., the client station 25-1) and a second sub-region 210 selected for a second client station (e.g., the client station 25-2). In other words, the base station 14 is configured to limit allocation of resources for the client station 25-1 to be within the frequency sub-band corresponding to the data region 208, and to limit allocation of resources for the client station 25-2 to be within the frequency sub-band corresponding to the sub-region 210, in an embodiment. Because resource allocation for a particular client station 25 is limited to a certain frequency sub-band in the subframe 200, the client station 25 need not power circuitry needed to receive and/or process the entire channel bandwidth, at least when receiving the data region 24 of the subframe 200, in an embodiment.

The specific sub-band within which to schedule each client station 25 is selected based on channel characteristics of the communication channel between the base station 14 and each of the client station 25, in an embodiment. The channel characteristics between the base station 14 and the client stations 25 are estimated implicitly at the base station 14 based on uplink transmissions from the client stations 25, in some embodiments. In other embodiments, channel characteristics (also referred to as channel state information, or SCI) are estimated explicitly at the client stations 25 are then fed back to the base station 14, in various embodiments. In any event, based on the channel characteristics, the base station 14 selects, for each client station 25, a sub-band having "best" or "sufficient" channel characteristics with respect to each client station 25, and schedules downlink and/or uplink transmissions to (or from) the client station 25 within the selected sub-band for the client station 25, in an embodiment.

With continued reference to FIG. 2, in an embodiment, each of the client stations 25-1 and 25-2 is configured to operate in a partially powered state when receiving and/or processing at least the data region 204 of the subframe 200. For example, the client station 25-1 is configured to power only the portion of the circuitry needed to receive and/or process the sub-band 208 when receiving and/or processing the data region 204 of the subframe 200, in an embodiment. For example, the client station 25-1 is configured to operate in a fully powered state over the entire channel bandwidth during reception and/or processing of the control region 202 of the subframe 200, and to operate in a partially powered state over the sub-band 208 during reception and/or processing of the data region 204 of the subframe 200. Similarly, the client station 25-2 is configured to power only the portion of the circuitry needed to receive and/or process the sub-band 210 when receiving and/or processing the data region 204 of the subframe 200, in an embodiment. For example, the client station 25-2 is configured to operate in a fully powered state over the entire channel bandwidth during reception and/or processing of the control region 202 of the subframe 200, and to operate in a partially powered state over the sub-band 210 during reception and/or processing of the data region 204 of the subframe 200. Thus, each client station receiving the subframe 200 is able to conserve power during reception of the data region 204 of the subframe 200, in at least some embodiments.

In some embodiments, the base station 14 is configured to maintain allocation within the selected frequency sub-band for a client station 25 over multiple subframes scheduled for the client station 25. In some such embodiments, the client station 25 is configured to switch to a fully powered state when the client station 25 needs to receive and/or process the entire channel bandwidth (e.g., during control regions of at least some subframes received by the client station 25) and to switch to a partially powered state, powering only the portion of the circuitry needed to receive and/or process the particular frequency sub-band selected for the client station 25 during at least the data region of each of the multiple subframes received by the client station 25. In some embodiments, to allow the base station 14 to efficiently allocate resources for a client station 25 within the frequency sub-band selected for the client station 25, and to allow the client station 25 to operate in a partially powered state during reception and/or transmission of subframes by the client station 25, the client station 25 is configured to perform partial channel estimation, limited to the frequency sub-band selected for the client station 25, and to report channel the partial channel information to the base station 14. For example, wideband CSI measurement is disabled at the client station 25, and only partial CSI, corresponding to the selected frequency sub-band for the client station 25, is obtained at the client station 25 and fed back to the base station 14, in an embodiment.

Figure 3A:
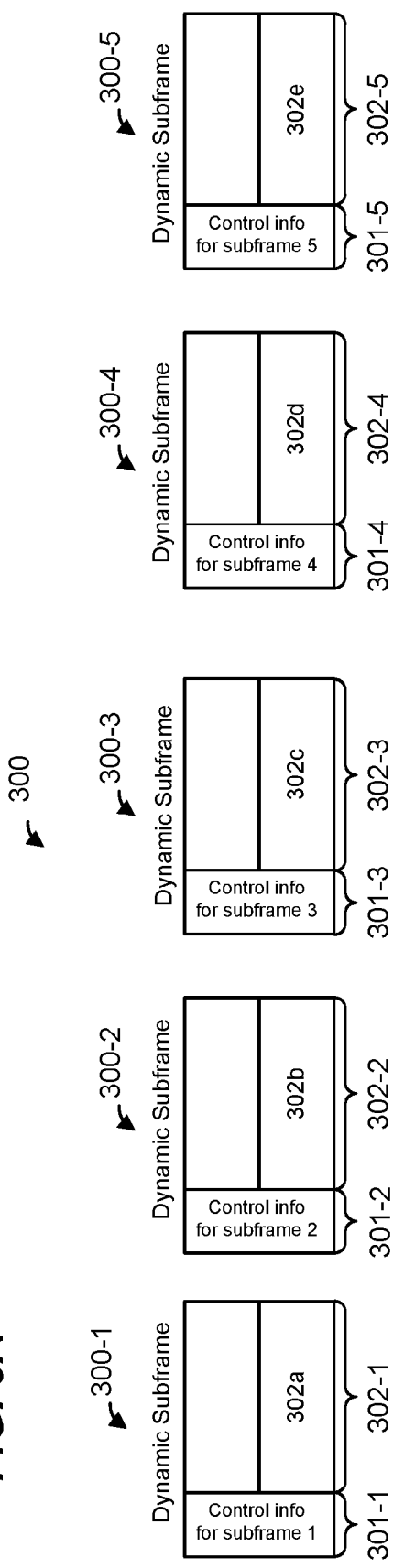
FIG. 3A is a diagram of an example sequence of five subframes transmitted by a base station to at least a first client station, according to an embodiment and/or scenario.
Figure 3B:
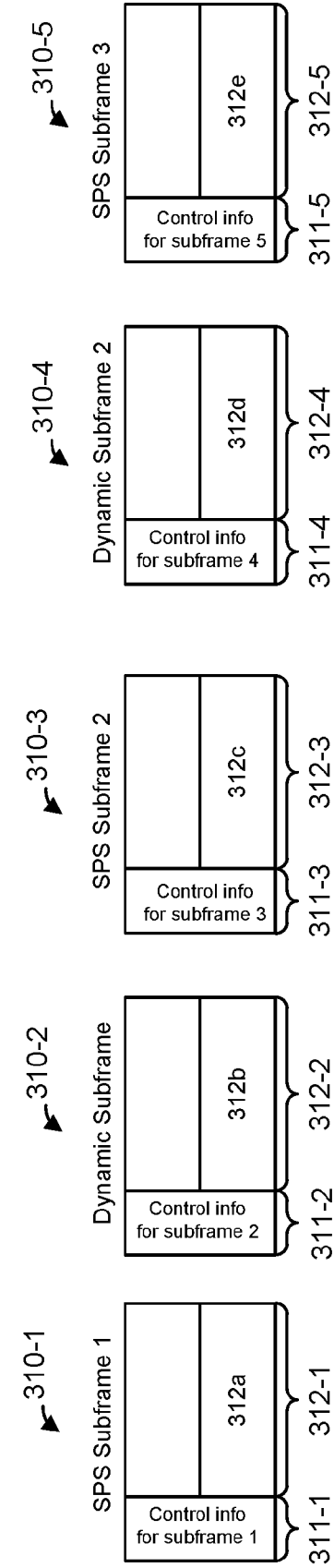
FIG. 3B is a diagram of an example sequence of subframes transmitted by the base station to least a first client station, according to another embodiment and/or scenario.
Figure 3C:
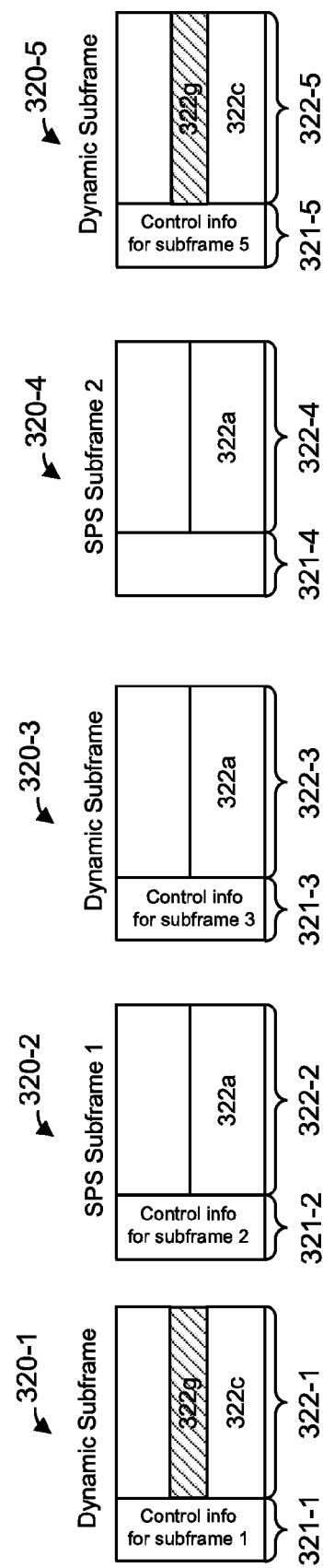
FIG. 3C is a diagram of an example sequence of subframes transmitted by the base station 14 to at least a first client station, according to another embodiment and/or scenario.

FIGS. 3A-3C are diagrams illustrating several example scenarios with multiple subframes transmitted by the base station 14 to several client stations 25, according to several embodiments. FIG. 3A illustrates an example sequence of subframes 300 transmitted by the base station 14 to at least a first client station 25 (e.g., the client station 25-1), according to an embodiment and/or scenario. The subframes 300 are sequentially transmitted by the base station 14 as subframes of a single frame, in an embodiment. In the embodiment of FIG. 3A, each subframe 300 is a dynamically scheduled subframe. In other words, scheduling for the subframes 300 is performed on a subframe per subframe basis, in this embodiment. In some embodiments, the subframes 300 are structured the same as or similar to the subframe 200 of FIG. 2. For example, each subframe 300 includes a control region 301 followed by a data region 302. As illustrated, the control region 301 of each subframe 300 is distributed over the entire bandwidth of the subframe 300, while the data region 302 of each subframe 300 is multiplexed, in frequency, among several client station 25, in an embodiment. In an embodiment, the base station 14 schedules transmissions to several client stations 25 within each subframe 300, scheduling transmissions in respective frequency sub-bands selected for each of the several client stations 25. For example, the base station 14 schedules transmissions to the client station 25-1 within the same sub-band 302A in each of the subframes 300, allowing the client station 25-1 to save power by partially powering circuitry needed to receive and process the data regions 312 of the subframes 300. In other words, while specific resources within the each subframe 300 are dynamically allocated to the client station 25-1, resource allocation for the client station 25-1 is within the sub-band 302A for each of the subframes 300, in this embodiment. In an embodiment, the client station 25-1 operates in a fully powered state during the control region 301 of each subframe 300 and operates in a partially powered state, powering circuitry needed to receive and process only the sub-band 302A during the data region 302 of each of the subframes 300.

FIG. 3B illustrates an example sequence of subframes 310 that include data transmitted by the base station 14 at least a first client station 25 (e.g., the client station 25-1), according to another embodiment and/or scenario. The subframes 310 are sequentially transmitted by the base station 14 as subframes of a single frame, in an embodiment. In the embodiment of FIG. 3B, each subframe 310 belongs to one of i) a dynamically scheduled subframe or ii) a semi-persistently scheduled subframe, with respect to the client station 25-1. In particular, subframes 310-1, 310-3, and 310-5 are semi-persistently scheduled subframes that contain semi-permanently scheduled transmissions to the client station 25-1, while subframes 310-2 and 310-4 are dynamically scheduled subframes that contain dynamically scheduled transmissions to the client station 25-1. In this case, the client station 25-1 obtains semi-permanent scheduling information for each of the subframes 310-1, 310-3, and 310-5 by receiving and processing the control region 311-1 of the first semi-persistent subframe 310-1. For example, the client station 25-1 learns from the control region 311-1 that the client station 25-1 should receive semi-permanently scheduled transmissions in the frequency region 312A in the data regions 312 of each of the subframes 310-1, 310-3, and 310-5, in an embodiment. According to an embodiment, the client station 25-1 operates in a fully powered state to receive and process the control region 311-1 of the subframe 310-1, and operates in a partially powered state, powering circuitry needed to receive and process only the sub-band 312A, during the data region 312-1 of the subframe 310-1. Then, the client station 25-1 returns to the fully powered state to receive and process the control region 311-2 of the first dynamically scheduled subframe 310-2, and switches back to the partially powered state during the data region 312-2 of the subframe 310-2. Because the next subframe to be received by the client station 25-1 is the second SPS subframe 312-3, the client station 25-1 need not receive the control region 311-3 of the subframe 310-3, and the client station 25-1 remains in the partially powered state for the duration of the entire subframe 310-3, in an embodiment. Then, the client station 25-1 returns to the fully powered state during the control region 311-4 of the dynamically scheduled subframe 310-4, and again switches back to the partially powered state during the data region 312-4 of the dynamically scheduled subframe 310-4. The client station 25-1 the remains in the partially powered state for the duration of the third SPS subframe 310-5, in an embodiment.

FIG. 3C is a diagram of an example sequence of subframes 320 transmitted by the base station 14 to at least a first client station 25 (e.g., the client station 25-1), according to another embodiment and/or scenario. The subframes 320 are sequentially transmitted by the base station 14 as subframes of a single frame, in an embodiment. In the embodiment of FIG. 3B, each subframe 310 belongs to one of i) a dynamically scheduled subframe or ii) a semi-persistently scheduled subframe, with respect to the client station 25-1. Further, the subframes 320 include some subframes that carry broadcast data to multiple client stations 25, in the illustrated embodiment. In particular, subframes 320-1, 320-3, and 320-5 are dynamically scheduled subframes, while subframes 320-2 and 320-4 are SPS subframes. Further, subframes 320-1 and 320-2 include broadcast data from bother the first client station 25 (e.g., the client station 25-1) and a second client station 25 (e.g., the client station 25-2). In an embodiment, the base station 14 schedules broadcast transmissions to the client station 25-1 in a sub-band 322g that neighbors (e.g., is adjacent to) a sub-band 322c allocated to unicast transmissions to the client station 25-1. Further, for subframes that do not contain broadcast transmissions, the base station 14 schedules unicast transmissions to the client station 25-1 within a sub-band 322a, which is within a frequency band collectively spun by the sub-bands 320c and the sub-band 322g, in an embodiment.

With continued reference to FIG. 3C, in an embodiment, the client station 25 operates in a fully powered state during the control region 321-1 of the subframe 320-1, and switches to a partially powered state, powering circuitry needed to receive and process only the sub-bands 323c and 322g, during the data region 322-1 of the subframe 320-1. The client station 25-1 then returns to the fully powered state during the control region 321-2 of the first SPS subframe 320-2, in an embodiment. Then, the client station 25-1 returns to the partially powered state during the data region 322-2 of the subframe 320-2, in an embodiment. Because the partially powered state powers circuitry needed to receive and process only the sub-bands 323c and 322g, the client station 25-1 is able to receive the sub-band 322a, which is within the sub-band collectively spun by the sub-bands 323c and 322g, in an embodiment. The client station 25-1 then returns to the fully powered state during the control region 321-3 of the subframe 320-3, and switches back to the partially powered state during the data region 322-3 of the subframe 320-3. Because the next subframe to be received by the client station 25-1 is the SPS subframe 320-4, the client station 25-1 remains in the partially powered state for the duration of the subframe 320-4, in an embodiment. The client station 25-1 then returns to the fully powered state during the control region 321-5 of the subframe 320-5, and switches back to the partially powered state during the data region 322-5 of the subframe 320-5. Because the partially powered state, in this case, powers circuitry needed to receive and process the frequency sub-bands 322c and 322g, the client station 25-1 is able to receive and process the unicast data in the sub-band 322c and the broadcast data in the sub-band 322g, in an embodiment.

In some embodiments, the base station 14 is configured to confine the control information, as well as the data, for a client station to be within a selected frequency sub-band for the client station. FIG. 4 is a diagram of a subframe 400 that the base station 14 is configured to transmit to several client stations 25, according to one such embodiment. The subframe 400 includes a control region 401 and a data region 404. The subframe 400 is similar to the subframe 200 of FIG. 2, except that the control region 401 of the subframe 400 includes a respective sub-region for each of the client stations 25 to which the subframe 400 is directed, in an embodiment. In particular, in the embodiment of FIG. 4, the control region 401 includes a first sub-region 402 and a second sub-region 403. In an embodiment, the first sub-region 402 includes control information for a first client station (e.g., the client station 25-1), and the second sub-region 403 includes control information for a second client station (e.g., the client station 25-2).

With continued reference to FIG. 4, similar to the subframe 200 of FIG. 2, the data region 404 of the subframe 400 is subdivided in frequency between two client stations, and includes a first sub-region 408 that contains data for a first client station (e.g., the client station 25-1), and a second sub-region 410 that contains data for a second client station (e.g., the client station 25-2). In an embodiment, the control sub-region for a client station is confined to be within the same frequency sub-band as the data region for the corresponding client station. Thus, the control sub-region 402 is confined to be within the same frequency sub-band as the data sub-region 408, and the control region 403 is confined to be within the same frequency sub-band as the data sub-region 410, in the illustrated embodiment. As a result, a client station receiving the subframe 400 need not switch to a fully powered state for reception and/or processing of the control region 401 of the sub-frame 400, in at least some situations, in an embodiment.

In some embodiments, each dynamically scheduled and/or semi-persistently scheduled (SPS) subframe in a sequence of subframes received by a client station 25 is structured the same as or similar to the subframe 400 of FIG. 4. For example, each of the subframes 300, 310, 320 of FIGS. 3A-3C is structured the same as or similar to the subframe 400 of FIG. 4. In such embodiments, because the control region of each subframe is confined to be within the same frequency sub-band as the corresponding data sub-region for the same client station, a client station receiving a sequence of subframes (e.g., in a frame) structured as the subframe 400 need not switch operation to a fully powered state for reception and/or processing of the control region of a subframe even when the client station needs to receive and process control information contained in the control region of the subframe (e.g., as in a dynamically scheduled subframe, or the first subframe in a sequence of SPS subframes). Thus, a client station receiving a sequence of such subframes is able to conserve additional power by remaining in the partially powered state for reception and/or processing of both the control region and the data region of each subframe in the sequence of subframes, in at least some embodiments.

Figure 5:
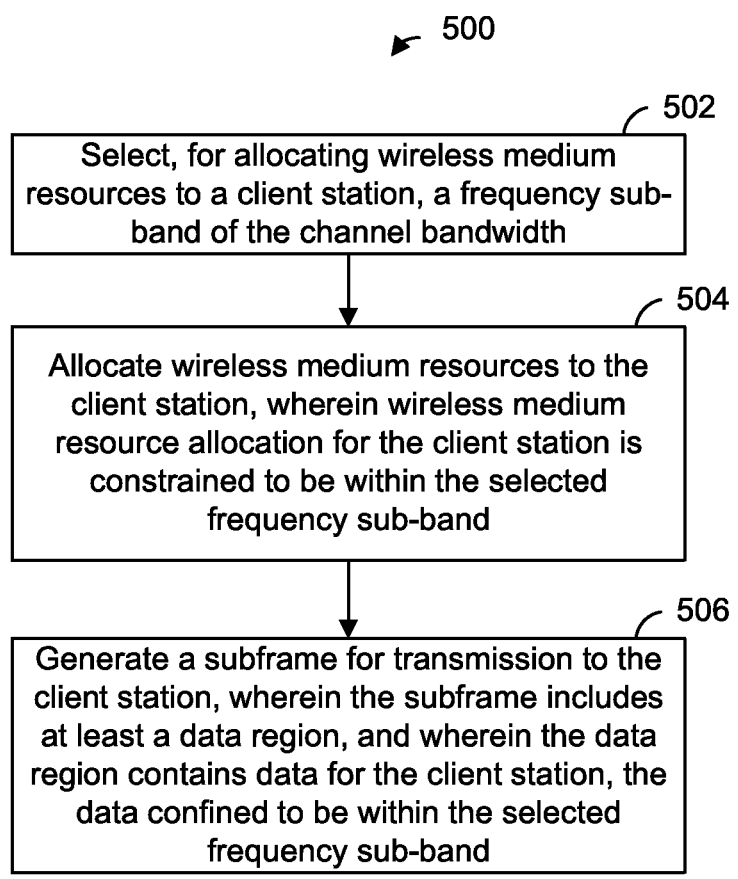
FIG. 5 is a flow diagram of an example method for allocating resources in a communication system, according to an embodiment.

FIG. 5 is a flow diagram of an example method 500 for allocating wireless medium resources in a communication system, the communication system including a base station and a plurality of client stations sharing a channel bandwidth, according to an embodiment. The method 500 is implemented by a base station, such as the base station 14 (FIG. 1), in an embodiment. For example, the method 500 is implemented, at least partially, by a processor of a base station, such as the host processor 15, or by the processor in combination with the network interface 16, in some embodiments. In some embodiments, the method 500 is implemented, at least partially, by a processor is included in the network interface 16, in conjunction with the interface 16. In another embodiment, the method 500 is implemented by another suitable communication device.

At block 502, a frequency sub-band of the channel bandwidth is selected at the base station for allocating wireless medium resources to a client station. The frequency sub-band is selected based, at least partially, on channel conditions measured or determined for the communication channel between the base station and the client station, in an embodiment. At block 504, wireless medium resources are allocated to the client station. In an embodiment, wireless medium resource allocation for the client station is constrained to be within the frequency sub-band selected for the client station at block 502.

At block 506, a subframe for transmission to the client station is generated. In an embodiment, the subframe 200 of FIG. 2 is generated. In another embodiment, the subframe 400 of FIG. 4 is generated. In other embodiments, other suitable subframes are generated. The subframe includes at least a data region, in an embodiment. The data region includes data for the client station. The data is confined to be within the frequency sub-band selected for the client station at block 502. In an embodiment, confining the data to the selected frequency sub-region allows the client station to operate in a partially powered state, in which reception and/or processing of only the selected frequency sub-band is powered at the client station at least for reception and/or processing of the data region of the subframe, in an embodiment.

In some embodiments, the subframe generated at block 506 is a subframe in a sequence of subframes generated at the base station for transmission to the client stations. For example, the subframe is one of the subframes 300, 310, or 320 of FIGS. 3A-3C, in some embodiments. In some such embodiments, the data for the client station in each of the subframes in the sequence of subframes is confined to be within the frequency sub-band selected for the client station at block 502, allowing the client station to switch to the partially powered state for reception and/or processing of at least the data region of each subframe in the sequence of subframes, for example in a manner described with regard to the FIG. 3A, FIG. 3B and/or FIG. 3C, in some example embodiments.

Figure 6:
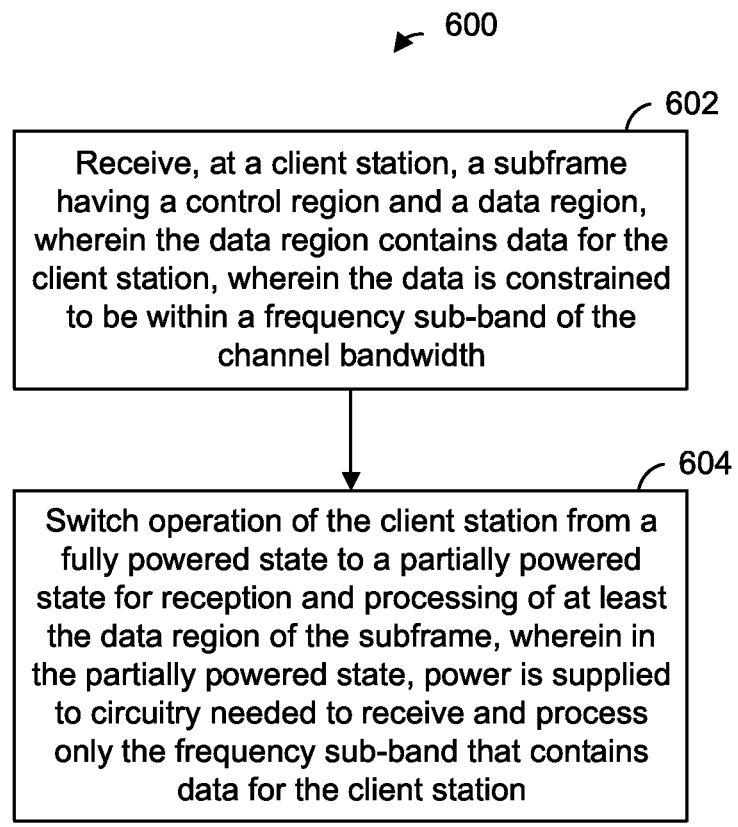
FIG. 6 is a flow diagram of an example method of operating a client station in a communication system, according to an embodiment.

FIG. 6 is a flow diagram of an example method 600 for of operating a client station in a communication system, the communication system including a base station and a plurality of client stations sharing a channel bandwidth, according to an embodiment. The method 600 is implemented by a client station, such as the client station 25-1 (FIG. 1), in an embodiment. The method 600 is implemented by the network interface 27, in some embodiments. In some embodiments, the method 600 is implemented by at least partially by a processor of a client station, such as the host processor 26, or by the processor in combination with the network interface 27. In some embodiments, a processor that implements, at least partially, the method 600 is included in the network interface 27. In another embodiment, the method 600 is implemented by another suitable communication device.

At block 600, a subframe transmitted by a base station is received at a client station. In an embodiment, the subframe 200 of FIG. 2 is received. In another embodiment, the subframe 400 of FIG. 4 is received. In another embodiment, another suitable subframe is received. In an embodiment, the subframe includes a control region and a data region. The data region contains data for the client station. In an embodiment, the data for the client station is confined to be within a frequency sub-band of the channel bandwidth. For example, the data for the client station is confined to be within a frequency sub-band selected (e.g., based on channel conditions) for the client station by the base station.

At block 604, operation of the client station is switched for a fully powered stated to a partially powered state for reception and processing of at least the data region of the subframe. In an embodiment, the client station switches to the partially powered state by supplying power to circuitry needed to receive and process only the frequency sub-band that contains data for the client station. Thus, the client station is able to save power by not powering circuitry for receiving and processing frequency bands that do not contain data for the client station, in an embodiment.

In some embodiments, the subframe received at block 602 is one or a sequence of subframes consecutively received by the client station from the base station. In some such embodiments, data in each of the subframes in the sequence of subframes is confined to be within the same frequency sub-band of the channel bandwidth. Further in some such embodiments, the control region of each subframe is distributed over the entire channel bandwidth. In other embodiments, the control region for each client station in each of the subframes in the sequence of subframes is confined to be within the same frequency sub-band as the data for the corresponding client station. In some embodiments, the client station switches to the partially powered state for reception and processing of at least the data region of each of the subframes in the sequence, for example in a manner described above with for example in a manner described with regard to the FIG. 3A, FIG. 3B and/or FIG. 3C, in some example embodiments.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

Further aspects of the present invention relate to one or more of the following clauses.

In one embodiment, a method of allocating wireless medium resources in a communication system, the communication system including a base station and a plurality of client stations sharing a channel bandwidth, includes selecting, for allocating wireless medium resources to a client station, a frequency sub-band of the channel bandwidth. The method also includes allocating, at the base station, wireless medium resources to the client station, wherein the base station is constrained to allocate wireless medium resources to the client station within the selected frequency sub-band. The method additionally includes generating a subframe for transmission to the client station, wherein the subframe includes at least a data region, and wherein the data region contains data for the client station, the data for the client station confined to be within the selected frequency sub-band.

In other embodiments, the method includes one or more of the following features.

The subframe further includes a control region, wherein the control region indicates the allocated wireless medium resources to the client station, and wherein the control region spans the channel bandwidth.

The subframe further includes a control region, wherein the control region indicates the allocated wireless medium resources to the client station, and wherein the control region is confined to be within the selected frequency sub-band for the client station.

The subframe is one of a plurality of subframes consecutively generated at the base station for transmission to the client station, and wherein, for each of the plurality of subframes, the base station is constrained to allocate resources to the client station within the selected frequency sub-band for the client station.

Each subframe in the plurality of subframes is dynamically scheduled, at the base station, with respect to the client station.

At least some subframes in the plurality of subframes are semi-persistently scheduled, at the base station, with respect to the client station.

The client station is a first client station and the selected frequency sub-band for the client station is a first frequency sub-band.

The subframe includes broadcast data for the first client station and at least a second client station.

The base station is further constrained to allocated a second frequency sub-band of the channel bandwidth for the broadcast data, wherein the second frequency sub-band is adjacent to the first frequency sub-band.

In another embodiment, a communication device that is configured to allocate wireless medium resources in a communication system, the communication system including a plurality of client stations sharing a channel bandwidth, comprises a network interface configured to select, for allocating wireless medium resources to a client station, a frequency sub-band of the channel bandwidth. The network interface is also configured to perform allocation of wireless medium resources to the client station, wherein allocation of wireless medium resources to the client station is constrained to be within the selected frequency sub-band. The network interface is additionally configured to generate a subframe for transmission to the client station, wherein the subframe includes at least a data region, and wherein the data region contains data for the client station, the data for the client station confined to be within the selected frequency sub-band.

In other embodiments, the communication device includes one or more of the following features.

The subframe further includes a control region, wherein the control region indicates the allocated wireless medium resources to the client station, and wherein the control region spans the channel bandwidth.

The subframe further includes a control region, wherein the control region indicates the allocated wireless medium resources to the client station, and wherein the control region is confined to be within the selected frequency sub-band for the client station.

The subframe is one of a plurality of subframes consecutively generated for transmission to the client station, and wherein, for each of the plurality of subframes, allocation of wireless medium resources to the client station is constrained to be within the selected frequency sub-band for the client station.

Each subframe in the plurality of subframes is dynamically scheduled with respect to the client station.

At least some subframes in the plurality of subframes are semi-persistently scheduled with respect to the client station.

The client station is a first client station and the selected frequency sub-band for the client station is a first frequency sub-band;

The subframe includes broadcast data for the first client station and at least a second client station.

The base station is further constrained to allocated a second frequency sub-band of the channel bandwidth for the broadcast data, wherein the second frequency sub-band is adjacent to the first frequency sub-band.

In yet another embodiment, a method of operating a client station in a communication system, the communication system including a base station and a plurality of client stations sharing a channel bandwidth, includes receiving, at a client station, a subframe having a control region and a data region, wherein the data region contains data for the client station, wherein the data is constrained to be within a frequency sub-band of the channel bandwidth. The method additionally includes switching operation of the client station from a fully powered state to a partially powered state for reception and processing of at least the data region of the subframe, wherein in the partially powered state, power is supplied to circuitry needed to receive and process only the frequency sub-band that contains data for the client station.

In other embodiments, the method includes one or more of the following features.

The subframe is one of a plurality of subframes consecutively received at the client station.

Each subframe in the plurality of sub-frames includes a control region and a data region, wherein the data region of each subframe includes data for the client station, and wherein data for the client station is constrained to be within the frequency sub-band.

The method further comprises operating the client station in the partially powered state for reception and processing of at least the data region of each subframe of the plurality of subframes.

Each subframe in the plurality of subframes is dynamically scheduled at the base station, wherein the control region of each subframe is distributed over the channel bandwidth, and wherein the method further comprises operating the client station in the fully powered state during the control region of the subframe, and switching operation of the client station to the partially powered state for reception and processing of the data region of each subframe.

At least some subframes of the plurality of subframes are semi-persistently scheduled at the base station, and wherein the control region of each subframe is distributed over the channel bandwidth.

The method further comprises operating the client station in the fully powered state for reception and processing of the control region a first semi-persistently scheduled subframe in a sequence of semi-persistently scheduled subframes;

The method further comprises switching to the partially powered state for reception and processing of the data region of the first semi-persistently scheduled subframes; and The method further comprises operating the client station in the partially powered state for reception and processing of both (i) the control region and (ii) the data region of each subsequently received semi-persistently scheduled subframes in the sequence of semi-persistently scheduled subframes.

The client station is a first client station, and at least one subframe of the plurality of subframes includes broadcast data for the first client station and a second client station, wherein the broadcast data is contained in a frequency sub-band adjacent to the first frequency sub-band, and wherein, in the partially powered state, power is supplied to circuitry needed to receive and process only the frequency only (i) the first frequency sub-band and (ii) the second frequency sub-band.

In still another embodiment, a communication device configured to operate in a communication system, the communication system including a plurality of client stations sharing a channel bandwidth, comprises a network interface configured to receive a subframe having a control region and a data region, wherein the data region contains data for the communication device, the data constrained to be within a frequency sub-band of the channel bandwidth. The network interface is additionally configured to switch operation from a fully powered state to a partially powered state for reception and processing of at least the data region of the subframe, wherein in the partially powered state, power is supplied to circuitry needed to receive and process only the frequency sub-band that contains data for the communication device.

In other embodiments, the communication device includes one or more of the following features.

The subframe is one of a plurality of subframes consecutively received by the communication device.

Each subframe in the plurality of sub-frames includes a control region and a data region, wherein the data region of each subframe includes data for the communication device, and wherein data for the communication device is constrained to be within the frequency sub-band.

The network interface is further configured to switch operation from the fully powered state to the partially powered state for reception and processing of at least the data region of each subframe of the plurality of subframes.

Each subframe in the plurality of subframes is dynamically scheduled.

The control region of each subframe is distributed over the channel bandwidth.

The network interface is further configured to operate in the fully powered state for reception and processing of the control region of each subframe, and to the partially powered state for reception and processing of the data region of each subframe.

At least some subframes of the plurality of subframes are semi-persistently scheduled.

The control region of each subframe is distributed over the channel bandwidth; and The network interface is further configured to operate in the fully powered state for reception and processing of the control region a first semi-persistently scheduled subframe in a sequence of semi-persistently scheduled subframes, The network interface is further configured to switch to the partially powered state for reception and processing of the data region of the first semi-persistently scheduled subframes.

The network interface is further configured to operate in the partially powered state for reception and processing of both (i) the control region and (ii) the data region of each subsequently received semi-persistently scheduled subframes in the sequence of semi-persistently scheduled subframes.

The frequency sub-band is a first frequency sub-band, and at least one subframe of the plurality of subframes includes broadcast data for the communication device and for another communication device operating in the communication network, wherein the broadcast data is contained in a frequency sub-band adjacent to the first frequency sub-band, and wherein, in the partially powered state, power is supplied to circuitry needed to receive and process only the frequency only (i) the first frequency sub-band and (ii) the second frequency sub-band.

While the present disclosure has been described with reference to specific examples, which are intended to be illustrative only and not to be limiting of the invention, changes, additions and/or deletions may be made to the disclosed embodiments without departing from the scope of the invention.

The invention claimed is:

1. A method in a communication system, the communication system including a base station and a plurality of client stations sharing a channel bandwidth, the method comprising:
   receiving, at a client station, a subframe having a control region and a data region, wherein
      the control region of the subframe is distributed over the channel bandwidth,
      the data region contains data for the client station, and
      the data is constrained to be within a frequency sub-band of the channel bandwidth;
   during reception of the subframe at the client station, operating the client station in a fully powered state during the control region of the subframe to process the control region that is distributed over the channel bandwidth; and
   during reception of the subframe at the client station and after receiving the control region of the subframe, switching operation of the client station from the fully powered state to a partially powered state for reception and processing of at least the data region of the subframe, wherein in the partially powered state, power is supplied to circuitry needed to receive and process only the frequency sub-band that contains data for the client station.

2. The method of claim 1, further comprising:
   selecting, for allocating wireless medium resources to the client station, the frequency sub-band of the channel bandwidth;
   allocating, at the base station, wireless medium resources to the client station, wherein the base station is constrained to allocate wireless medium resources to the client station within the selected frequency sub-band; and
   generating, at the base station, the subframe for transmission to the client station.

3. The method of claim 2, wherein the control region indicates the allocated wireless medium resources to the client station, and wherein the control region spans the channel bandwidth.

4. The method of claim 2, wherein the control region indicates the allocated wireless medium resources to the client station, and wherein the control region is confined to be within the selected frequency sub-band for the client station.

5. The method of claim 2, wherein the subframe is one of a plurality of subframes consecutively generated at the base station for transmission to the client station, and wherein, for each of the plurality of subframes, the base station is constrained to allocate resources to the client station within the selected frequency sub-band for the client station.

6. The method of claim 5, wherein each subframe in the plurality of subframes is dynamically scheduled, at the base station, with respect to the client station.

7. The method of claim 5, wherein at least some subframes in the plurality of subframes are semi-persistently scheduled, at the base station, with respect to the client station.

8. The method of claim 2, wherein:
   the client station is a first client station and the selected frequency sub-band for the client station is a first frequency sub-band;
   the subframe includes broadcast data for the first client station and at least a second client station; and
   the base station is further constrained to allocate a second frequency sub-band of the channel bandwidth for the broadcast data, wherein the second frequency sub-band is adjacent to the first frequency sub-band.

9. The method of claim 1, wherein:
   the subframe is one of a plurality of subframes consecutively received at the client station;
   each subframe in the plurality of sub-frames includes a control region and a data region, wherein the data region of each subframe includes data for the client station, and wherein data for the client station is constrained to be within the frequency sub-band; and
   the method further comprises operating the client station in the partially powered state for reception and processing of at least the data region of each subframe of the plurality of subframes.

10. The method of claim 9, wherein
   each subframe in the plurality of subframes is dynamically scheduled at the base station;
   the control region of each subframe is distributed over the channel bandwidth; and
   wherein the method further comprises
      operating the client station in the fully powered state during the control region of each subframe to process the control region of each subframe, and
      switching operation of the client station to the partially powered state for reception and processing of the data region of each subframe.

11. The method of claim 9, wherein at least some subframes of the plurality of subframes are semi-persistently scheduled at the base station, and wherein the control region of each subframe is distributed over the channel bandwidth, the method further comprising:
   operating the client station in the fully powered state for reception and processing of the control region a first semi-persistently scheduled subframe in a sequence of semi-persistently scheduled subframes;

switching to the partially powered state for reception and processing of the data region of the first semi-persistently scheduled subframes; and operating the client station in the partially powered state for reception and processing of both (i) the control region and (ii) the data region of each subsequently received semi-persistently scheduled subframes in the sequence of semi-persistently scheduled subframes.

12. The method of claim 9, wherein:
the client station is a first client station; and
at least one subframe of the plurality of subframes includes broadcast data for the first client station and a second client station, wherein the broadcast data is contained in a frequency sub-band adjacent to the first frequency sub-band, and wherein, in the partially powered state, power is supplied to circuitry needed to receive and process only (i) the first frequency sub-band and (ii) the second frequency sub-band.

13. A communication system comprising:
a network interface of a communication device, the network interface configured to
receive a subframe having a control region and a data region, wherein
the control region of the subframe is distributed over a channel bandwidth shared by a plurality of client stations in the communication system,
the data region contains data for the communication device, and
the data constrained to be within a frequency sub-band of the channel bandwidth;
wherein the network interface is further configured to
during reception of the subframe at the client station, operate in a fully powered state for reception and processing of the control region of the subframe that is distributed over the channel bandwidth, and
during reception of the subframe at the client station and after receiving the control region of the subframe, switch operation from the fully powered state to a partially powered state for reception and processing of at least the data region of the subframe, wherein in the partially powered state, power is supplied to circuitry needed to receive and process only the frequency sub-band that contains data for the communication device.

14. The communication system of claim 13, wherein the network interface of the communication device is a first network interface of a first communication device, and wherein the system further comprises:
a second network interface of a second communication device, the second network interface configured to
select, for allocating wireless medium resources to the first communication device, the frequency sub-band of the channel bandwidth,
perform allocation of wireless medium resources to the first communication device, wherein allocation of wireless medium resources to the first communication device is constrained to be within the selected frequency sub-band, and
generate the subframe for transmission to the first communication device.

15. The communication system of claim 14, wherein the control region indicates the allocated wireless medium resources to the first communication device, and wherein the control region spans the channel bandwidth.

16. The communication system of claim 14, wherein the control region indicates the allocated wireless medium resources to the first communication device, and wherein the control region is confined to be within the selected frequency sub-band for the first communication device.

17. The communication system of claim 14, wherein the subframe is one of a plurality of subframes consecutively generated for transmission to the first communication device, and wherein, for each of the plurality of subframes, allocation of wireless medium resources to the first communication device is constrained to be within the selected frequency sub-band for the first communication device.

18. The communication system of claim 17, wherein each subframe in the plurality of subframes is dynamically scheduled with respect to the first communication device.

19. The communication system of claim 17, wherein at least some subframes in the plurality of subframes are semi-persistently scheduled with respect to the first communication device.

20. The communication system of claim 14, wherein:
the selected frequency sub-band for the first communication device is a first frequency sub-band;
the subframe includes broadcast data for the first communication device station and at least a third communication device; and
the second network interface is configured to allocate a second frequency sub-band of the channel bandwidth for the broadcast data, wherein the second frequency sub-band is adjacent to the first frequency sub-band.

21. The communication system of claim 13, wherein:
the subframe is one of a plurality of subframes consecutively received by the communication device;
each subframe in the plurality of sub-frames includes a control region and a data region, wherein the data region of each subframe includes data for the communication device, and wherein data for the communication device is constrained to be within the frequency sub-band; and
the network interface is further configured to switch operation from the fully powered state to the partially powered state for reception and processing of at least the data region of each subframe of the plurality of subframes.

22. The communication system of claim 21, wherein:
each subframe in the plurality of subframes is dynamically scheduled;
the control region of each subframe is distributed over the channel bandwidth; and
the network interface is further configured to operate in the fully powered state for reception and processing of the control region of each subframe, and to switch operation to the partially powered state for reception and processing of the data region of each subframe.

23. The communication system of claim 21, wherein:
at least some subframes of the plurality of subframes are semi-persistently scheduled;
the control region of each subframe is distributed over the channel bandwidth; and
the network interface is further configured to
operate in the fully powered state for reception and processing of the control region a first semi-persistently scheduled subframe in a sequence of semi-persistently scheduled subframes,
switch to the partially powered state for reception and processing of the data region of the first semi-persistently scheduled subframes, and
operate in the partially powered state for reception and processing of both (i) the control region and (ii) the data region of each subsequently received semi-persistently scheduled subframes in the sequence of semi-persistently scheduled subframes.

24. The communication system of claim 21, wherein:
the frequency sub-band is a first frequency sub-band; and
at least one subframe of the plurality of subframes includes broadcast data for the communication device and for another communication device operating in the communication network, wherein the broadcast data is contained in a frequency sub-band adjacent to the first frequency sub-band, and wherein, in the partially powered state, power is supplied to circuitry needed to receive and process only (i) the first frequency sub-band and (ii) the second frequency sub-band.

* * * * *